(12) United States Patent
Mauersberger et al.

(10) Patent No.: US 7,441,059 B2
(45) Date of Patent: Oct. 21, 2008

(54) METHOD AND DEVICE FOR DATA COMMUNICATION

(75) Inventors: Heiko Mauersberger, Erfurt (DE); René Richter, Erfurt (DE)

(73) Assignee: Pro Design Electronics GmbH, Bruckmuehl (DE)

( * ) Notice: Subject to any disclaimer, the term of this patent is extended or adjusted under 35 U.S.C. 154(b) by 0 days.

(21) Appl. No.: 10/616,764

(22) Filed: Jul. 9, 2003

(65) Prior Publication Data

US 2004/0024816 A1  Feb. 5, 2004

(30) Foreign Application Priority Data

Jul. 11, 2002  (DE) ................................ 102 31 424

(51) Int. Cl.
*G06F 13/00* (2006.01)
*G06F 13/38* (2006.01)
*G06F 13/14* (2006.01)
*G06F 15/16* (2006.01)
*G06F 13/36* (2006.01)
*G06F 1/00* (2006.01)

(52) U.S. Cl. ................. 710/107; 710/113; 710/240; 710/305; 709/251; 713/324

(58) Field of Classification Search ................. 710/107, 710/316, 240, 305, 113; 707/102; 709/251; 713/320, 324
See application file for complete search history.

(56) References Cited

U.S. PATENT DOCUMENTS

| | | | |
|---|---|---|---|
| 4,646,232 A * | 2/1987 | Chang et al. ................ | 710/113 |
| 4,679,192 A * | 7/1987 | Vanbrabant ................. | 370/438 |
| 4,972,313 A | 11/1990 | Getson, Jr. et al. | |
| 5,018,059 A * | 5/1991 | Kerschner et al. ........... | 379/246 |
| 5,457,683 A | 10/1995 | Robins | |
| 5,555,425 A | 9/1996 | Zeller et al. | |
| 5,561,797 A * | 10/1996 | Gilles et al. .................... | 707/8 |
| 6,041,365 A * | 3/2000 | Kleinerman ................ | 719/328 |
| 6,122,285 A * | 9/2000 | Okada ........................ | 370/450 |
| 6,253,292 B1 * | 6/2001 | Jhang et al. ................. | 711/146 |
| 6,256,722 B1 | 7/2001 | Acton et al. | |

(Continued)

OTHER PUBLICATIONS

David King et al, Intel iAPX 432 Computer Science 460 Final Project, Apr. 15, 1999,www.brouhaha.com.*

(Continued)

*Primary Examiner*—Khanh Dang
*Assistant Examiner*—Christopher A Daley
(74) *Attorney, Agent, or Firm*—Townsend and Townsend and Crew, LLP

(57) ABSTRACT

A device for data communication between a first host device or a further host device and at least one client device along a shared transmission path includes a first host device, which includes a host application; at least one further host device, which includes a host application; at least one client device, which includes a client application; a bus control module; the host devices and the client device(s) and the bus control module being connected to one another by the transmission path for exchanging data and/or signals and the bus control module being implemented to control the access of the host devices to the transmission path. A method of data communication running on this device provides the transmission path to the host device in the event the host device wishes access to the transmission path.

9 Claims, 3 Drawing Sheets

U.S. PATENT DOCUMENTS

| | | | |
|---|---|---|---|
| 6,360,225 B1* | 3/2002 | Kleewein et al. | 707/102 |
| 6,407,983 B1* | 6/2002 | Zheng et al. | 370/232 |
| 6,484,216 B1* | 11/2002 | Zegelin | 710/11 |
| 6,493,784 B1* | 12/2002 | Kamimura et al. | 710/309 |
| 6,577,918 B1* | 6/2003 | Roth | 700/177 |
| 6,725,295 B2* | 4/2004 | Iwatani | 710/38 |
| 6,748,419 B2* | 6/2004 | Grayson et al. | 709/205 |
| 6,748,473 B1* | 6/2004 | Shatas et al. | 710/300 |
| 6,772,269 B1* | 8/2004 | Kaganoi | 710/310 |
| 6,820,158 B1* | 11/2004 | Lee et al. | 710/305 |
| 7,043,579 B2* | 5/2006 | Dhong et al. | 710/107 |
| 7,046,665 B1* | 5/2006 | Walrand et al. | 370/392 |
| 2002/0087733 A1* | 7/2002 | Ohkawa et al. | 709/251 |
| 2003/0025729 A1* | 2/2003 | Davis | 345/753 |
| 2003/0169734 A1* | 9/2003 | Lu et al. | 370/386 |

OTHER PUBLICATIONS

Dirk Leinenbach, Implementierung eines maschinell verifizierten Prozessors, Jul. 2005.

* cited by examiner

METHOD AND DEVICE FOR DATA COMMUNICATION

BACKGROUND OF THE INVENTION

The present invention relates to a device and a method for data communication between a first host device or a further host device and at least one client device along a shared transmission path. A host device is a host computer (personal computer, workstation), for example, and a client device may be any arbitrary hardware application (e.g., FPGA or ASIC).

FIG. 3 shows a communication system from the applicant of the present application, which is known under the trademark UMRBus. This communication system allows easy transmission of data and/or signals between a host device or host computer (300) and assigned hardware (clients), such as ASICs or FPGAs. Different software applications may communicate with their corresponding hardware applications via independent virtual channels, which use the same hardware interface between the host computer (300) and the client hardware (331, 332, 333). This communication system represents a simple standardized interface between the host computer (300) and at least one client (331, 332, 333). This client (331, 332, 333) may be a software application or a hardware application.

Individual host applications (301, 302, 303), which are indicated in FIG. 1 with "HAPP" (host application), are connected via a host application interface (310) "HAPI" to a host application interface module (312) "HAPIM". The host application is a program which exchanges data with one or more client application(s) via the host application interface. The host application interface module (312) is a software library which provides multiple functions and commands for access on the communication system. A host application interface HAPI is an interface onto which host applications are placed.

The host application interface module (312) is directly connected to a software interface module (314) "SIM", which typically corresponds to the device driver specific to the operating system. A host application interface module HAPIM provides the host application interface and transmits data from and to clients in cooperation with the software interface module.

The software interface module (314) is connected via a standardized interface connection (316), PCI or RS232, for example, to a hardware interface module (318) "HIM". The hardware interface module (318) represents the counterpart to the software interface module (314) in hardware. This hardware interface module (318) may, for example, have a PCI controller and an interface component between the PCI controller and a data bus. The software interface module SIM executes the data exchange between the host application interface module HAPIM and the hardware interface HIM.

An essential feature of the hardware interface module (318) is that it always provides a physical data bus (320) on the side away from the software. This data bus (320) connects the hardware interface module (318) to multiple client application interface modules (341, 342, 343) "CAPIM". In this case, the data bus (320) represents a ring connection between the client application interface modules (341, 342, 343) linked therein and the hardware interface module (318).

The hardware interface module HIM exchanges data with the software interface module SIM and makes the data bus available to the clients.

Each client application interface module (341, 342, 343) represents a type of node which is incorporated into the physical data bus (320). Each client application interface module (341, 342, 343) is connected via a client application interface (322) "CAPI" to a client application (351, 352, 353) "CAPP". Each client application interface module (341, 342, 343) has its own address and a type identity and provides the client application interface (322) for the client application (351, 352, 353).

In the device shown in FIG. 3, all of the data communication is controlled by the host computer (300).

In this case, data exchange may only occur between one hardware interface module (318) and one client application interface module (341, 342, 343) at a time. Therefore, communication is only possible between the host computer (300) and the client applications (351, 352, 353), but not within the client applications (351, 352, 353), implemented in the example shown as hardware. In addition, this known device for data communication may not be used in systems having multiple host computers.

SUMMARY OF THE INVENTION

An object of the present invention is to provide a device for data communication between a first host device or a further host device and at least one client device along a shared transmission path, as well as a corresponding method of data communication.

The object relating to the device is achieved by the features described herein.

Using this device according to the present invention, data communication is made possible on a shared transmission path even if multiple host devices are provided. For example, this device may be used within image processing systems based on FPGA, in order to control the image processing implemented in FPGA, even if the image processing system has its own integrated processor, i.e., its own host device, which may, using the data bus, wish to change parameters in parallel to the higher order host device. In this case, the bus control module in the device according to the present invention assumes the task of controlling which of the host devices may use the transmission path in a specific period of time or for a specific quantity of data.

The first and/or the further host device, particularly the host application, preferably has a processor.

The transmission path is preferably implemented in this case as a data bus. Advantageous aspects of this device are specified in further details below of data communication in accordance with the embodiments of the present invention.

The object relating to the method is specified in further details below.

An essential feature of this method according to the present invention is the provision and transmission of arbitration information on the transmission path along the open communication connection, the arbitration information ensuring that only one host device receives access to the transmission path at any time. Preferred embodiments and refinements of the method according to the present invention are specified in further details below.

The present invention is described in greater detail in the following on the basis of an example with reference to the drawing.

DESCRIPTION OF THE PREFERRED EMBODIMENTS

Figure 1:
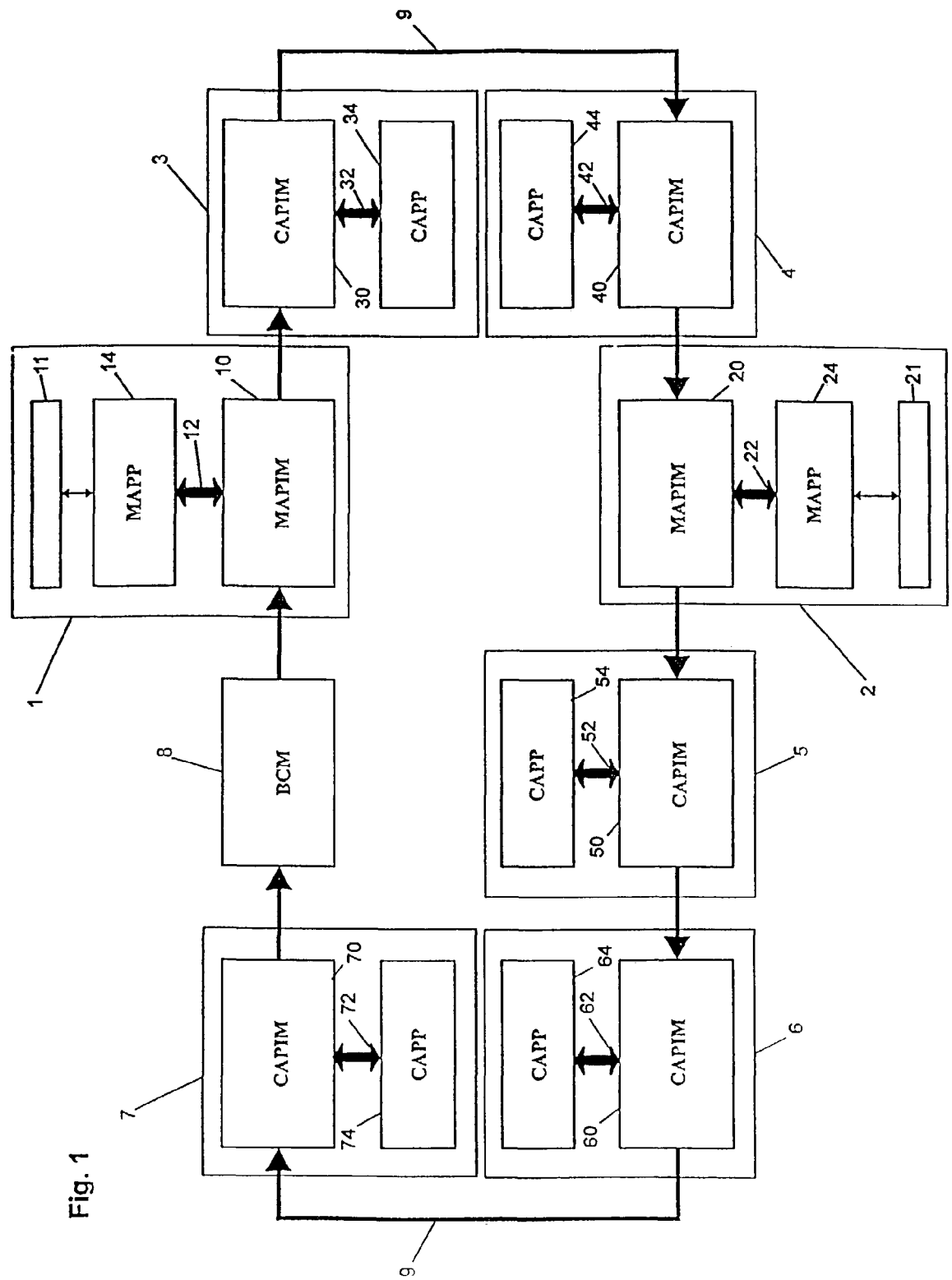
FIG. 1 shows an exemplary schematic illustration of a device for data communication according to an embodiment of the present invention.

FIG. 1 shows a device for data communication according to the present invention having two host devices 1, 2. The first host device 1 has a personal computer (PC) 11, for example, and the second host device 2 has a processor integrated in a hardware application (embedded processor) 21, for example. A hardware application of this type having an integrated processor may be an ASIC or an FPGA having an integrated processor, for example. FPGAs of this type are used in image processing systems, for example. Thus, for example, parameters for a frame grabber are transmitted from the first host computer to the FPGA hardware, which has the integrated processor.

The first host computer 1 and the second host computer 2 are each provided with a master application 14, 24 "MAPP", which is linked in a data bus 9 via a master application interface module "MAPIM".

The master application 14, 24 is an application implemented in hardware in this example, which is connected via a master application interface 12, 22 "MAPI" to the master application interface module 10, 20 and via this to the data bus 9.

Furthermore, five client devices 3, 4, 5, 6, 7 are provided, for example, which each have a client application "CAPP" 34, 44, 54, 64, 74. Each client application is connected via a client application interface "CAPI" 32, 42, 52, 62, 72 to a client application interface module "CAPIM" 30, 40, 50, 60, 70, which are each connected into the data bus 9.

In this case, a client application is an application implemented in hardware which, via the client application interface 32, 42, 52, 62, 72, exchanges data via the data bus 9 with one of the host computers 1, 2. This data exchange is controlled by the corresponding master application 14, 24.

The client application interface modules 30, 40, 50, 60, 70 each form the interface between the data bus 9 and the particular client application interface 32, 42, 52, 62, 72. The particular clients 3, 4, 5, 6, 7 connected via these client application interfaces 32, 42, 52, 62, 72 to the data bus 9 and/or the client applications 34, 44, 54, 64, 74 running thereon are only provided with the data and services which relate to the particular client application 34, 44, 54, 64, 74.

Furthermore, a bus control module "BCM" 8, which administrates the access of the individual master application interface modules 10, 20 to the data bus 9 and monitors the data bus interrupts, is linked in the data bus 9.

Figure 3:
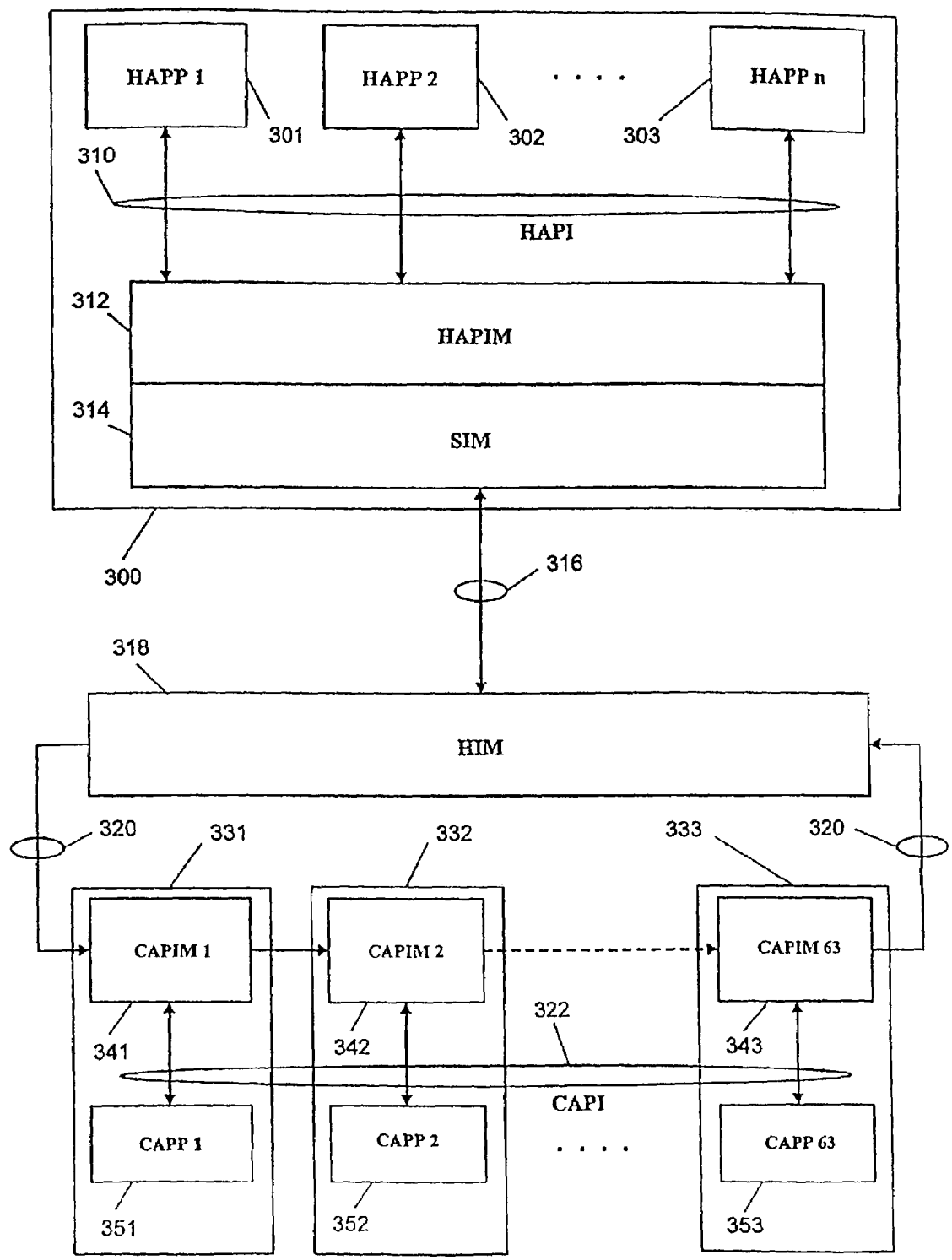
FIG. 3 shows the schematic construction of a device for data communication according to the related art.

In this device according to the present invention, the hardware interface module HIM is not, as in the related art shown in FIG. 3, linked directly in the data bus, but provides the data on the data bus 9 via the master application interface module 10, 20. The hardware interface module HIM may be formed in this case by the particular master application MAPP 14, 24.

Figure 2:
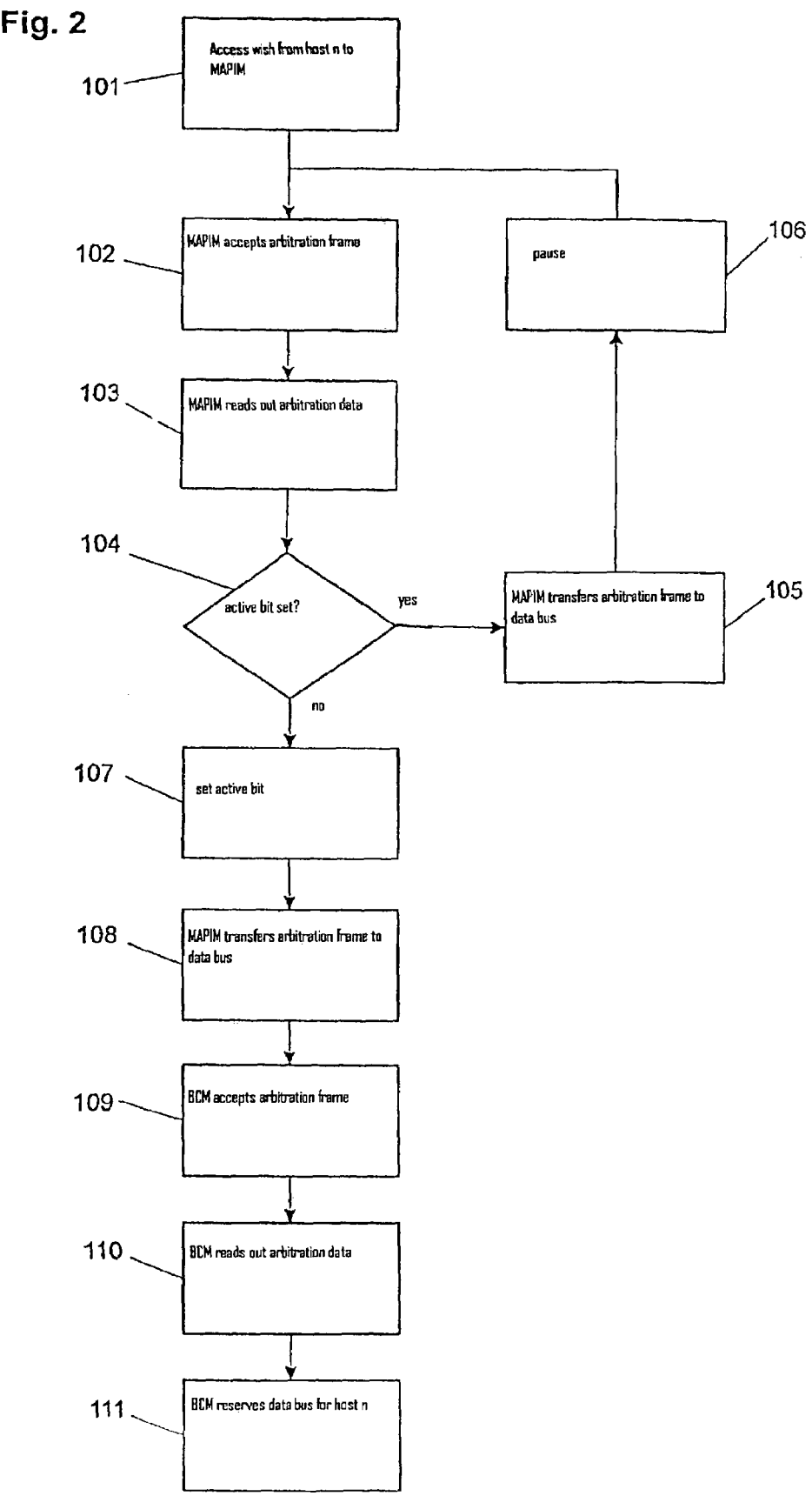
FIG. 2 shows an exemplary flow chart of the data communication in accordance with an embodiment of the method of the present invention.

In the following, the access administration of a host device to a client device is described on the basis of FIG. 2.

At the beginning of operation, the bus control module BCM 8 transmits arbitration information which is continuously available on the data bus 9. This arbitration information is, for example, implemented as an arbitration frame which contains a frame header and a data word.

If a host computer wishes to access the data bus and transmit data to or exchange data with a client application via the bus, it indicates this access wish to the master application interface module MAPIM assigned to it in step 101. The master application interface module MAPIM then accepts the arbitration frame relayed on data bus 9 in step 102 and reads out the arbitration data therefrom in step 103. An activity bit is included in the arbitration data which specifies whether the data bus 9 is currently used by another application. If this activity bit is not set, this indicates that the data bus 9 is free.

In step 104, the master application interface module MAPIM now checks whether the activity bit is set or not. If the activity bit is set, i.e., the data bus is not free, the MAPIM relays the arbitration frame further to the data bus in step 105 and accepts it again after a pause 106 in order to repeat steps 102 to 104.

If, however, it was determined in step 104 that the activity bit is not set, i.e., the data bus is free, the master application interface module MAPIM sets the activity bit in turn in step 107 and thus indicates that it wishes to access the data bus 9. The arbitration frame is then transferred to the data bus 9 again in step 108 and runs further there until it reaches the bus control module BCM 8. This module accepts the arbitration block in step 109, reads out the arbitration data in step 110, and reserves the data bus 9 for the querying host computer in step 111.

A master application interface module MAPIM therefore may only use the data bus when it receives the arbitration frame and the activity bit has not already been set therein by another master application interface module. The arbitration frame is received by the bus control module BCM and is not given back to the data bus if the activity bit is set. The master application interface module MAPIM which has set the activity bit may now transmit data via the data bus 9.

After termination of this releasing data communication via the data bus 9 or after expiration of the predetermined time interval or the predetermined data volume for data transmission, the master application interface module MAPIM transmits the arbitration frame again, but now with the activity bit deactivated, which indicates that the data bus 9 is now free again. In this way, it is ensured that only one master application interface module MAPIM is active on the data bus 9 at a time and overlaps of data transmissions on the data bus do not occur. The bus control module BCM 8 monitors the data bus 9 in that it counts the pulses between the passage of two arbitration frames using a counter. If the count exceeds the predetermined limiting value of the number of pulses per access, it is concluded therefrom that no arbitration frame was received. This may occur, for example, due to an interruption of the data bus 9 or a reset of the entire device. In this case, the bus control module 8 retransmits an arbitration frame having a deactivated activity bit and thus automatically releases the blocked data bus 9 again.

If an interrupt is displayed on the data bus, the bus control module BCM 8 takes over the data bus 9 and transmits an interrupt frame. If the interrupt frame was successfully transmitted, the bus control module BCM 8 transmits an "interrupt information frame". Using this "interrupt information frame", the master application interface module MAPIM is informed about the interrupt status of the individual client application interface modules CAPIM and may relay this information to the particular master application MAPP for further processing. In this way, it is ensured that all host computers are informed about interrupts.

In this way, a device according to the present invention for data communication, using a data communication method running thereon, with a multimaster-capable data bus 9 is provided.

The present invention is not restricted to the exemplary embodiment above, which is merely used for general explanation of the core idea of the present invention. Rather, within the scope of protection, the device according to the present invention may also assume other embodiments than those described above. In particular, the device may have features which represent a combination of the particular individual features described above.

Reference numbers used throughout the description and the drawing are merely used for better understanding of the present invention and are not intended to restrict the scope of protection.

The invention claimed is:

1. A device for data communication between a first host device or a further host device and at least one client device on a shared transmission path having:
    a first host device, which includes a host application;
    at least one further host device, which includes a host application;
    at least one client device, which includes a client application; and
    a bus control module;
    the host devices each having a master application interface module, which is linked in the transmission path;
    the host devices each having a master application module which connects the particular host application to the assigned master application interface module;
    each client device having a client application interface module, which is linked in the transmission path and is connected to the assigned client application;
    the transmission path being implemented as a data bus representing a ring connector;
    the respective master application interface module of each host device and the respective client application interface module of each client device being connected to one another by the data bus for exchanging data and/or signals with one another and
    the bus control module being implemented to control the access of the host devices to the data bus, wherein
    the bus control module is provided in the ring structure of the data bus and is connected to the respective master application interface module of each host device and the respective client application interface module of each client device by the data bus for exchanging data and/or signals with one another and
    the bus control module is provided with a counter which counts the pulses between the passage of two arbitration frames relayed on the data bus and
    the bus control module is provided with a comparator circuit which compares the number of the elapsed pulses between the two arbitration frames against a predetermined target number of said pulses and
    when the number of said elapsed pulses exceeds said predetermined target number, the bus control module transmits a new arbitration frame having a deactivated activity bit in order to release the blocked data bus.

2. The device according to claim 1, wherein the host applications of the first and/or the further host devices have a processor.

3. A method of data communication in a device for data communication as claimed in claim 1 between a first host device or a further host device and at least one client device on a shared transmission path implemented as a data bus representing a ring connection, having the following steps:
    opening a communication connection between a host application running on the host device and a client application running on the client device;
    transmitting arbitration information on the data bus along the opened communication connection, the arbitration information containing data, on the basis of which the data bus is reserved for a predetermined time interval or for a predetermined data volume for a subsequent data transmission on the data bus along the opened communication connection;
    transmitting data and/or signals between the host application and the client application and/or between the client application and the host application on the data bus along the opened communication connection
    wherein the passage of an arbitration frame containing the arbitration information on the data bus is monitored by a bus control module in such a way that the pulses between two passages of the arbitration frame are counted and
    wherein a new arbitration frame having a deactivated activity bit is transmitted by the bus control module when the number of counted pulses exceeds a predetermined value.

4. The method according to claim 3, wherein the arbitration information is transmitted as an arbitration block, an arbitration block having arbitration data which includes information about the length of the predetermined time interval or about the extent of the predetermined data volume for the subsequent data transmission.

5. The method according to claim 4, wherein the arbitration block has activity data which includes information about the current state of the transmission path, from which it may be concluded whether the transmission path is currently being used for data transmission.

6. The method according to claim 3, wherein in the event of an access wish of a host application to the transmission path, the following steps are performed:
    the master application interface module assigned to the host application accepts the arbitration block present on the transmission path,
    reads out the activity data,
    checks, on the basis of the activity data, whether the transmission path is currently free for data transmission,
    writes, if the transmission path is free, activity data in the arbitration block which indicates use of the transmission path by the host application, and
    transfers the arbitration block to the bus control module via the transmission path;
    upon which the bus control module reserves the transmission path for the access by the host application.

7. The method according to claim 6, wherein after termination of a data transmission, the activity data in the arbitration block is reset by the master application interface module and the transmission path is thus released again.

8. A method of data communication in a device for data communication as claimed in claim 1 between a first host device or a further host device and at least one client device on a shared transmission path implemented as a data bus representing a ring connection, comprising:
    opening a communication connection between a host application running on the host device and a client application running on the client device;
    transmitting arbitration information provided in an arbitration block on the data bus along the opened communication connection, the arbitration information containing data, on the basis of which the data bus is reserved for a predetermined time interval or for a predetermined data volume for a subsequent data transmission on the data bus along the opened communication connection;

transmitting data and/or signals between the host application and the client application and/or between the client application and the host application on the data bus along the opened communication connection;

wherein in the event of an access wish of a host application to the transmission path, the following steps are performed:

the master application interface module assigned to the host application accepts the arbitration block present on the transmission path, reads out activity data from the arbitration block, checks, on the basis of the activity data, whether the transmission path is currently free for data transmission, writes, if the transmission path is free, activity data in the arbitration block which indicates use of the transmission path by the host application, and transfers the arbitration block to the bus control module via the transmission path;

upon which the bus control module reserves the transmission path for the access by the host application and wherein the passage of an arbitration frame containing the arbitration information on the data bus is monitored by a bus control module in such a way that the pulses between two passages of the arbitration frame are counted and wherein a new arbitration frame having a deactivated activity bit is transmitted by the bus control module when the number of counted pulses exceeds a predetermined value.

9. A device for data communication between a first host device or a further host device and at least one client device on a shared transmission path having:

a first host device, which includes a host application;

at least one further host device, which includes a host application;

at least one client device, which includes a client application; and a bus control module;

the host devices each having a master application interface module, which is linked in the transmission path;

the host devices each having a master application module which connects the particular host application to the assigned master application interface module;

each client device having a client application interface module, which is linked in the transmission path and is connected to the assigned client application;

the transmission path being implemented as a data bus representing a ring connector;

the respective master application interface module of each host device and the respective client application interface module of each client device being connected to one another by the data bus for exchanging data and/or signals with one another and the bus control module being implemented to control the access of the host devices to the data bus, wherein the bus control module is provided in the ring structure of the data bus and is connected to the respective master application interface module of each host device and the respective client application interface module of each client device by the data bus for exchanging data and/or signals with one another and the bus control module is provided with a counter which counts the pulses between the passage of two arbitration frames relayed on the data bus and wherein in the case of a blocked data bus the bus control module transmits a new arbitration frame having a deactivated activity bit in order to release the blocked data bus.

* * * * *